United States Patent [19]
Hecklinger

[11] 3,753,295
[45] Aug. 21, 1973

[54] HEIGHT GAUGE AND AUXILIARY ATTACHMENTS THEREFOR

[76] Inventor: Harold M. Hecklinger, 8001 N. Ozanam, Niles, Ill. 60648

[22] Filed: July 22, 1971

[21] Appl. No.: 165,138

[52] U.S. Cl. .................................................. 33/170
[51] Int. Cl. ......................................... G01b 5/02
[58] Field of Search ............... 33/170, 169 B, 168 B

[56] References Cited
UNITED STATES PATENTS

| | | |
|---|---|---|
| 2,766,531 | 10/1956 | Egli .................................... 33/170 |
| 3,510,952 | 5/1970 | Milan .................................. 33/170 |
| 2,515,583 | 7/1950 | Bennett ............................... 33/170 |
| 2,771,683 | 11/1956 | Kirchhof ............................. 33/170 |
| 2,953,855 | 10/1960 | Rodwell .............................. 33/170 |
| 3,106,022 | 10/1963 | Milan .................................. 33/170 |

Primary Examiner—Robert B. Hull
Attorney—Edward R. Lowndes

[57] ABSTRACT

A multi-purpose gauging instrument embodying a pedestal which embraces a freely and vertically slidable carrier having integral vertically spaced projections defining gauging surfaces. A micrometer head has its sleeve fixedly secured to the upper end of the carrier and is movable bodily therewith, while the lower end of the micrometer spindle is engageable with the upper end face of the carrier so that when it rests thereon the micrometer head yields an accurate reading of the elevation of the carrier, and consequently of the gauging surfaces. A layout tool and a sine bar rest constitute auxiliary adjuncts which may be attached to the carrier to extend the usefulness of the instrument.

2 Claims, 8 Drawing Figures

Patented Aug. 21, 1973
3,753,295
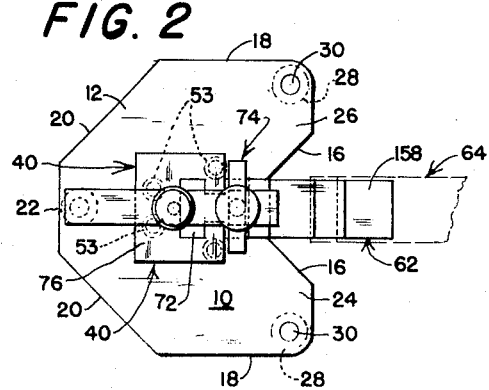
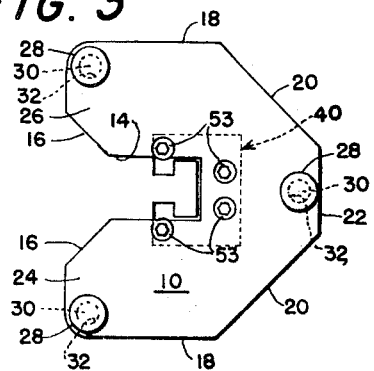
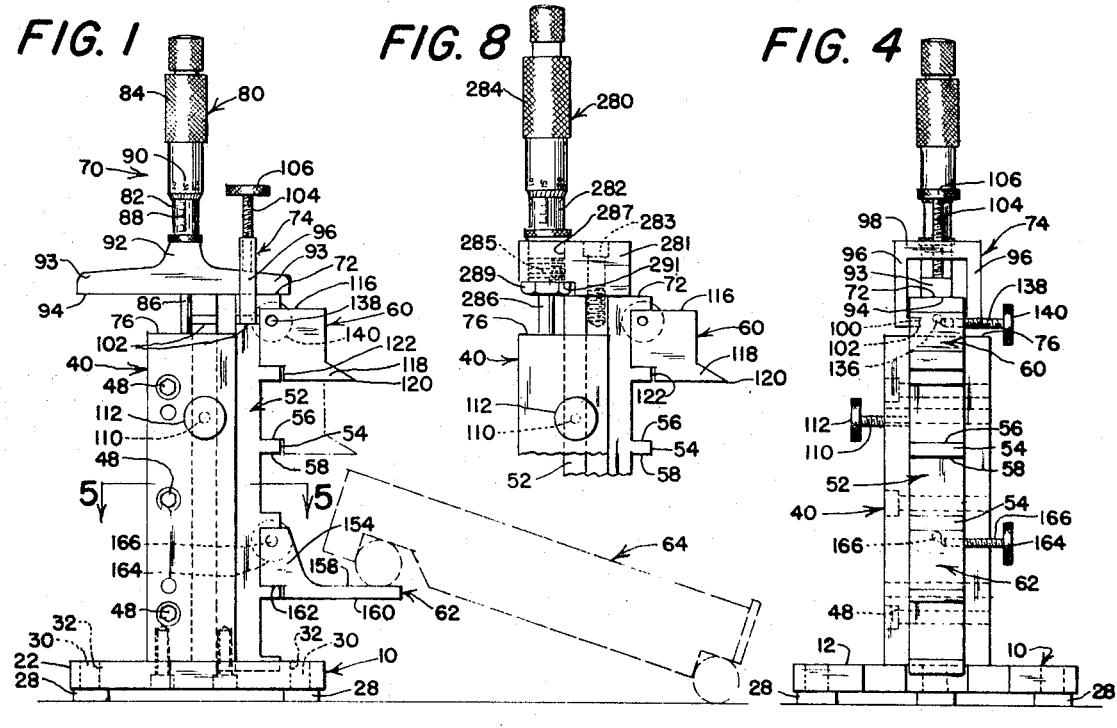
INVENTOR.
HAROLD H. HECKLINGER
BY
Edward R. Lowndes

HEIGHT GAUGE AND AUXILIARY ATTACHMENTS THEREFOR

The present invention relates to a multi-purpose gauging instrument which provides a basic precision standard for manufacturing measurements. More specifically, the invention is concerned with a height gauge of the general type which embodies a pedestal which is adapted to be supported on a table top or surface plate and which has associated therewith a vertically slidable carrier having vertically spaced projections thereon which establish gauging surfaces. Such height gauges vary widely in their construction. Usually a positive drive means such as a rack and pinion is provided for raising and lowering the carrier. Some such gauges utilize a dial reading for ascertaining the height of the carrier, while others utilize a vernier reading. Still other such gauges employ a micrometer reading.

The present invention is designed as an improvement over conventional height gauges of the type briefly outlined above in that a gauge embodying the principles thereof is capable of performing functions that are not available to height gauges which currently are in use, the instrument also being capable of performing the usual height gauge functions in a more simple manner and consequently in less time.

The advantages of the present invention will be more fully appreciated after a brief understanding of the present height gauge instrument has been attained. Accordingly, the present invention contemplates the provision of a height gauge of the character briefly outlined above and wherein the carrier is freely slidable in the pedestal and normally rests by gravity on the surface plate or other foundation surface at a zero setting for all of the gauging faces which are associated therewith. The aforementioned micrometer reading is effected by the provision of a conventional micrometer head embodying the usual thimble, sleeve and spindle, means being provided whereby the micrometer sleeve may be fixedly and removably mounted on the upper end of the carrier so that the entire micrometer head moves vertically with the carrier. The micrometer spindle directly overies the upper flat end face of the pedestal and is directly engageable with such end face so that when the spindle is fully retracted with the micrometer head yielding a zero reading, the carrier is also at its zero position with respect to the surface plate. Raising of the carrier from such zero position may thus be effected either by manually lifting the same or by rotating the micrometer thimble to project the spindle and thus force the micrometer sleeve and its attached carrier upwardly. During such micrometer operation, the micrometer reading will at times represent the height of the carrier above the surface plate. According to the present invention, a layout tool of special construction is capable of attachment to the carrier at selected elevations and, when so attached, extends the usefulness of the height gauge instrument. Such layout tool, when applied to the carrier in an upright position, presents an accurate upwardly facing horizontal precision extension of one of the gauge faces on the carrier which may be used either for height measuring prupOses, or for cooperation with a conventional sine bar. When the carrier layout tool is applied in an inverted position, it presents an accurate downwardly facing horizontal precision extension of one of the gauging surfaces and which likewise may be used for measuring purposes. Alternatively, such extension may be brought to rest by gravity upon the upper end face of a workpiece so that the micrometer head will yield an accurate indication or reading of the height of such workpiece. The layout tool, when applied to the carrier in either its upright or its inverted position, also presents a forward knife edge which may be used for scribing purposes. As will become clear when the nature of the invention is better understood, various modified forms of layout tools for use with the carrier are contemplated although not specifically illustrated or described herein.

Bearing in mind the structure of the present height gauge as briefly outlined above, one of the principal features of the invention resides in the fact that the carrier is freely slidable vertically in its encompassing pedestal and is not hampered in its movements by rack and pinion devices, worm drive mechanisms or the like so that it may be raised manually to bring the downwardly facing surface of the layout tool above the level of a given workpiece, after which the carrier may be manually lowered until such surface on the layout tool comes to rest by gravity on the workpiece for an immediate manipulation of the micrometer head and a consequent subsequent direct reading thereof to ascertain the height of the workpiece. In this manner the delays and possible cumulative errors ordinarily involved when height transfer operations are resorted to are avoided.

A further and important feature of the invention resides in the fact that because the present height gauge instrument employs a conventional or standard micrometer head for read-out purposes, and because such micrometer head is capable of being easily and operatively attached to the upper end of the carrier, the instrument may be manufactured on the basis of the fact that the purchaser will furnish his own micrometer head, thereby greatly reducing the manufacturing costs which are involved in connection with conventional height gauges where specially designed dial read-out or micrometer read-out devices and operating mechanisms therefor are embodied in the instrument.

Yet another feature of the present invention relates to the the integral construction of the carrier and its associated projections, such carrier being in the form of an accurately machined and polished unit wherein the various gauging faces which are presented by the vertically spaced projections remain at all times at predetermined spaced distances from one another and are not subject to cumulative errors which may arise when separate gauge pieces are assembled in stacked relationship one above the other and finally clamped together, as is the case in forming the carrier of many conventional height gauges of the type under consideration.

The provision of a gauging instrument which is relatively simple in its construction and which therefore may be manufactured at a low cost; one which is comprised of a minimum number of parts, particularly moving parts, and which therefore is unlikely to get out of order; one which is rugged and durable and which therefore will withstand rough usage; one which in the manufacture thereof does not involve complicated and difficult machining operations, thereby further contributing to its low cost; one which is capable of ease of assembly and disassembly for purposes of inspection of parts, replacement or repair thereof; one which requires no particular or unusual degree of skill for its proper operation and which therefore falls within the manipulative skill and comprehension of the average machinist; and one which otherwise is well adapted to perform the services required of it, are further desirable features which have been borne in mind in the production and development of the present invention.

The provision of a gauging instrument such as has briefly been set forth above, and possessing the stated advantages, constitutes the principal object of the present invention. Other objects and advantages of the invention, not at this time set forth, will readily suggest themselves as the following description ensues.

In the accompanying single sheet of drawings forming a part of this specification, two illustrative embodiments of the invention have been shown.

In these drawings:

FIG. 1 is a side elevational view of a gauging instrument embodying the principles of the present invention;

FIG. 2 is a top plan view of the structure shown in FIG. 1;

FIG. 3 is a bottom plan view of the gauging instrument with the carrier removed in the interests of clarity;

FIG. 4 is a front elevational view of the instrument;

FIG. 5 is a fragmentary sectional view taken substantially on the line 5—5 of FIG. 1;

FIG. 6 is a side elevational view of a combined layout tool and scriber which is capable of being employed in connection with the instrument;

FIG. 7 is a sectional view taken substantially on the line 7—7 of FIG. 6; and

FIG. 8 is a fragmentary side elevational view, similar to FIG. 1, showing a slightly modified form of gauging instrument constructed according to the invention.

Referring now to the drawings in detail and in particular to FIGS. 1 to 3 inclusive, the gauging instrument of the present invention involves in its general organization a fixed relatively heavy thick base 10 which preferably is formed of machined steel, although it may be a casting, and which presents a flat horizontal upper surface 12. The base 10 is of irregular contour, it being recessed at its forward edge to provide a rectangular open-ended slot 14 which has its inner end disposed substantially centrally of the base and opens out onto the front edge of the base in wide angle V fashion as indicated at 16. The side edges 18 of the base are parallel and they merge on a generally arcuate bias with a pair of rearwardly and inwardly inclined edges 20 which, in turn, merge with a relatively short rear edge 22. The slot 14, 16, in combination with the side edges 18, establish, in effect, a pair of forward side wing portions 24 and 26. The particular shape of the base 10 is not critical and other shapes than the illustrated polygonal shape illustrated in FIGS. 2 and 3 may be employed if desired, the important shape characteristic being the provision of the recessed front edge.

If desired, the underneath side of the base 10 may be accurately machined to conform to the upper side of a surface plate or gauging table of the type commonly used with instruments of the character under consideration, but in the illustrated form of the invention the base 10 is adapted to be supported a slight distance above such surface plate or gauging table of the type commonly used with instruments of the character under consideration but in the illustrated form of the invention the base 10 is adapted to be supported a slight distance above the surface plate by means of three cylindrical gauge pads 28, two of which are disposed adjacent the forward ends of the wings 24 and 26, and the third of which is disposed adjacent the rear edge 22 and lies on the longitudinal centerline of the base. These gauge pads may, if desired, have carbide bottom faces and they are accurately finished. Integral shank portions 30 on the pads are press fitted in bores 32 formed in the base 10. Three such pads are employed to provide a stable three-point support, thus assuring that the base assumes a horizontal position and will remain firmly seated on its supporting surface.

Projecting upwardly from the base 10 in the central region of the latter is a vertically disposed pedestal 40 which is preferably, but not necessarily, of a composite nature and consists of two sections 42 and 44 (see FIG. 5) which meet along an interfacial plane 46 and which are secured together by means of clamping screws 48. The sections 42 and 44 are accurately machined and the interfacial meeting surfaces are lapped or otherwise rendered f'at. The assembled two-piece pedestal 40 is approximately square in horizontal cross section with the two sections defining therebetween a forwardly opening T-slot 50 which is of full pedestal height and which constitutes a guideway for a gauging carrier 52, the nature of which will be made clear presently.

As best shown in FIGS. 1 and 3, the composite pedestal 40 is secured in position on the upper side of the base plate 10 by means of clamping screws 53 which project upwardly through the base plate, the position of the pedestal being such that the T-slot 50 registers with the slot 14 provided in the base plate as shown in FIG. 3.

The aforementioned carrier 52 is of elongated design and it is generally H-shape in horizontal cross section as best seen in FIG. 5, one leg of the "H" fitting snugly within the T-slot 50 and the other leg being disposed exteriorly of the slot. Extremely close tolerances are maintained in machining both the pedestal and the carrier so that the latter will slide freely and vertically on the pedestal but will not cock or bind. The forward side of the carrier 52 is provided with a plurality of forwardly extending gauging projections 54 which present upper and lower horizontal gauging surfaces 56 and 58 respectively. The projections 54 are preferably spaced along the body of the carrier 52 on 1 inch centers, six such carriers being illustrated herein although, if desired, a greater or lesser number of such projections May be employed alternatively. The use of 1 inch center spacing is merely exemplary herein and, accordingly, other uniform spacing of the projections may be resorted to as, for example, when constructing a gauging instrument which is based upon metric measurements. Where the projections are spaced apart on 1 inch centers as described herein, convenient gauging measurements may be made when the upper and lower gauging surfaces 56 and 58 lie in horizontal planes which are spaced apart 0.20 inches, thereby establishing a distance of 0.80 inches between any pair of opposed upper and lower gauging surfaces 56 and 58. The various gauging projections 54 extend forwardly of the body portion of the carrier 52 a sufficient distance to provide adequate working area for ease of use of such projections when taking measurements. As will be described in detail presently, the carrier 52, in addition to being capable of use for direct gauging measurements is designed for selective cooperation with certain carrier attachments including a reversible layout tool 60 the details of which are shown in FIGS. 6 and 7, and a reversible sine bar support 62 for use in connection with a conventional sine bar such as is shown in dotted line at 64 in FIGS. 1 and 2. The nature and function of the layout tool 60 and sine bar support 62 will be described in detail subsequently.

Means are provided for raising and lowering the carrier 52 under the control of micrometer adjustments, one such means being disclosed in FIGS. 1 and 4, and another such means being disposed in FIG. 8. Regardless of which means is employed, the actual raising and lowering movements of the carrier are effected under the control of the manipulations of a conventional micrometer instruments which is commercially available as a purchased item from a wide variety of manufacturers.

As shown in FIGS. 1 and 4, the preferred means for manually adjusting the height of the carrier 52 is in the form of a conventional micrometer depth gauge assembly 70 which is adapted to be removably and firmly clamped in position against the upper end face 72 of the carrier 52 for movement bodily therewith by means of a saddle clamp assembly 74. The upper end face 76 of the pedestal 40 constitutes a reaction surface against which the feeler arm or micrometer spindle of the depth gauge assembly 70 bears when the latter is manually operated.

As previously stated, the micrometer depth gauge assembly 70 is of conventional form and therefore need not be described in detail herein, it being deemed sufficient to point out that this assembly includes micrometer head 80 embodying the usual telescopic casing parts, namely a fixed inner part or sleeve 82 and a rotatable outer part or thimble 84. These parts are provided with internal threaded connections whereby rotation of the outer thimble 84 relative to the inner sleeve 82 will effect axial shifting of the thimble in telescopic fashion over the sleeve. A feeler arm or spindle 86, which is secured to and rotatable with the thimble, projects downwardly and outwardly from the lower end of the sleeve and the extent of such projection is measured by means of a longitudinal scale 88 on the sleeve and a vernier scale 90 on the rim of the thimble. The lower end of the sleeve 82 has fixedly mounted thereon the usual T-head 92 having laterally projecting side arms 93 through which the spindle 86 projects, the scales 88 and 90 being calibrated to indicate the extent of projection of the spindle below the underneath face of the T-head 92.

The aforementioned saddle clamp assembly 74 is provided for the purpose of removably clamping the depth gauge assembly 70 in position on the upper end of the carrier 52 in such a manner that the flat surface of the face 94 rests flush against the flat upper face 72 of the carrier 52 while the lower end of the feeler spindle 86 bears against the flat upper end face 76 of the pedestal 40. In this clamped position of the depth gauge assembly 70, it is apparent that manipulation of the micrometer head 80 will effect raising and lowering movements of the carrier in the T-slot 50 relative to the base 10 as well as to the surface plate or gauging table on which the base is supported.

The saddle clamp assembly 74 is in the form of a generally U-shaped frame piece of rectangular configuration and including a pair of parallel side legs (FIG. 4) 96 and a connecting bridge or bight portion 98. The lower ends of the side legs 96 are turned inwardly as indicated at 100 and are slidably received in a pair of horizontal slots 102 which are formed in the side faces of the carrier 52 adjacent the upper end of the latter. A clamping screw 104 having a knurled manipulating head 106 is threaded centrally through the bight portion 98 of the framepiece and the lower end of such screw is adapted to engage the upper surface of either leg 93 of the T-head 92 when the latter is in its operative position on the upper end of the carrier 52 as clearly shown in FIG. 1. When the clamping screw 104 is tightened the underneath side 94 of the T-head 92 is forced flush against the upper surface 72 of the carrier and the T-head as a whole, and consequently the entire depth gauge assembly 74, is clamped in its operative position wherein the lower end of the feeler spindle 86 engages the upper surface 76 of the pedestal 40 so that as the micrometer head 80 is manipulated, upward movement of the T-head 92 will be transmitted through the clamping screw 104 to the frame piece 96, 98 which, in turn, will cause raising of the carrier 52. A locking screw 110 having a relatively large knurled manipulating head 112 extends through a threaded bore 114 (FIG. 4) which is provided in the section 44 of the pedestal 40 and is engageable with the adjacent side of the carrier 52 for locking the latter in any selected position of micrometer adjustment.

As previously set forth, the projections 54 on the carrier 52 are of sufficient extent that their upper and lower gauging surfaces 56 and 58 may be used directly for measurement purposes but, in order to facilitate layout operations, the layout tool 60 which is disclosed in detail in FIGS. 5, 6 and 7 is provided and is capable of selective installation on the carrier 52 in either of two positions and at selected regions or levels along the carrier in increments of one inch. As will become clear presently, the layout tool 60 is so constructed that it fits between adjacent projections 54, i.e., between the downwardly facing gauging surface 56 of one projection and the upwardly facing gauging surface 58 of the next adjacent lower projection and when it is disposed in the upright position in which it is shown in FIGS. 1 and 5, it presents a downwardly facing gauging surface 114 which, in effect, constitutes a horizontal extension of the downwardly facing gauging surface 58 on one of the projections 54. In this upright position, the layout tool 60 also presents an upwardly facing gauging surface 116 which constitutes a horizontal extension of the upwardly facing surface 56 on one of the projections 54.

Accordingly, and with reference to FIGS. 4 and 5, the layout tool 60 is in the form of a machined steel part of block-like construction and including a rectangular body portion 117 of a width substantially equal to the transverse width of the projections 54, and consequently of the carrier 52. The aforementioned gauging surface 116 constitutes the upper rectangular face of the body portion while the gauging surface 114 constitutes the lower rectangular face thereof. The front side of the body portion 117 is provided with a forwardly projecting extension 118 of tapered design and the extreme forward end of which terminates in a sharp feeler gauge and scribing edge 120. The body portion 117 is formed with a relief area or notch 122 which extends along its lower rear edge and which is adapted to receive therein one of the projections 54 regardless of whether the layout tool installation is effected in an upright or an inverted position. The rear face 124 of the body portion 117 is adapted to fit flush against the front side of the carrier 52 in between adjacent projections 54 and, for this purpose, the vertical dimension of such rear face is preferably 0.80 inches on the basis of the aforementioned 0.80 inch distance between adjacent projections. However, the overall height of the layout tool is precisely 1 inch inasmuch as the vertical depth of the relief area or notch 122 is 0.20 inches. When the layout tool 60 is in position with the block 61 extending between a given pair of projections 54 and in an upright position as shown in FIG. 1, the scribing edge 120 will lie in the horizontal plane of the bottom surface 58 of the lower projection. When the layout tool 60 is in its inverted position, the scribing edge 120 will lie in the horizontal plane of the top surface 58 of the upper projection.

Means are provided whereby the layout tool 60 may be securely locked in position on the carrier 52 in any of the upright or inverted positions of which it is capable of assuming. Accordingly, as shown in FIG. 7, the body portion 117 is provided with a horizontal bore 130 and an intersecting vertical bore 132. The upper end of the bore 132 is formed with a restriction 134 and a locking ball 136, which may be a conventional ball bearing, is slidably disposed in the bore 132 and normally assumes a position wherein it is disposed entirely within the confines of such bore. A locking screw 138 having an enlarged knurled manipulating knob 148 thereon is threadedly received in the bore 130 and is provided with a pointed end 150 which bears against the ball 136 so that upon tightening of the screw 138, the pointed end 150 thereof will make camming engagement with the ball and force the same upwardly within the bore 132 and against the restriction 134. The diameter of the ball 136 is slightly greater than that of the restriction so that the ball cannot be forced from the bore 132 but, instead, when the screw is tightened will project outwardly a slight distance above the level of the upper face 116 of the body portion. Thus, when the layout tool 60 is in position between a pair of opposed gauging surfaces 56 and 58 on opposed projections 54, the ball 136 will bind within the bore 132 against the pointed end 150 of the clamping screw and the adjacent gauging surface, 56 or 58, as the case may be, and securely lock the layout tool in position on the carrier.

The aforementioned sine bar rest 62 constitutes a further carrier adjunct which enlarges the scope of operations to which the present gauging instrument may be put. This sine bar rest is similar to the layout tool 60 in that it embodies a body portion 154 from which there projects forwardly and horizontally a sine bar supporting surface having flat top and bottom sine bar-engaging surfaces 158 and 160 respectively. The body portion 154 is provided with a relief area or notch 122 of the layout tool 60 in order that the sine bar support 62 may be applied to the carrier 52 in either an upright position or an inverted position. The body portion is adapted to fit between adjacent projections 54 on the carrier in precisely the same manner as that described in connection with the layout tool 60. Additionally, the sine bar support is provided with a locking screw 164 and locking ball 166 which function in the same manner as the locking screw and ball arrangement associated with the layout tool 60 and which, therefore, require no further description herein.

It is to be noted at this point that when the sine bar support 62 is installed on the carrier 52 between any given pair of adjacent projections 54, the upwardly facing surface 158 lies in the same horizontal plane as that of the upper gauging surface 56 of the lower projection of the pair. When the sine bar support 62 is installed on the carrier in its inverted position, the surface 160 will lie in the same horizontal plane as that of the upper gauging surface 56, the upwardly facing surface, 158 or 160 as the case may be, constitutes a broad area rest for one end of a conventional sine bar such as has been shown in dotted lines in FIGS. 1 and 2. It is also to be noted that the aforementioned layout tool 60 is also capable of use as a sine bar support when the tool is installed between a given pair of adjacent projections 54 on the carrier 52 in an inverted position. In such an instance the surface 114 (FIG. 5) of the tool will be presented upwardly and, as previously described, will lie in the same horizontal plane as that of the upper gauging surface 56 of the upper projection of the pair. This upwardly presented surface is then available for use as a sine bar rest if desired. Finally, it is to be noted that when changeover operations are to be made, as for example when changing from a low level gauging or measuring operation to a higher level operation, it is not necessary to relocate the layout tool 60 or the sine bar support 62 at a higher level on the carrier 52. Under certain circumstances it may be found expedient simply to interpose one or more conventional 1 inch gauge blocks in position between the upper end face 76 of the pedestal 40 and the lower end of the feeler spindle 86 of the micrometer head 80. Such interpositioning of gauge blocks extends the range of the instrument and is a relatively easy matter inasmuch as the carrier 52 is at all times free for upward movement regardless of its position within the T-slot 50.

In the operation of the above-described gauging instrument, a wide variety of operations are possible. When the instrument is devoid of either the layout tool 60 or the sine bar rest 62, the upper and lower gauging surfaces 56 and 58 of the various projections 54 on the carrier 52 are available in the usual manner of operation of conventional height gauges as reference planes from which measurements may be made for transfer to a workpiece, or as surfaces which are brought to heights which are transferred to the instrument from a workpiece. When the layout tool 60 is applied to the carrier 52 in an upright position as previously described, direct height measurement of a workpiece may be made, thus eliminating the need for transfer operations. If the layout tool 60 is applied to the carrier in an inverted position, the flat surface 114 is available for sine bar support as likewise previously described. Additionally, in either position of the layout tool 60, scribing operations are made available by reason of the knife edge 120 which projects forwardly therefrom. Various other operations of the present gauging instrument, not specifically mentioned herein, may be effected at the discretion of the machinist or other operator, the nature of these operations being dependent upon the skill and experience of the operator, as well as upon the character of such auxiliary tools, instruments or other equipment which he may have in his possession.

In FIG. 8, a slightly modified form of gauging instrument which embodies the principles of the present invention is illustrated. In this form of the invention the base 10, pedestal 40, carrier 52 and the mounting means for the latter on the former remain substantially the same as in the previously described gauging instrument, as also do the layout tool 60 and the sine bar rest 62. The only difference between the gauging instrument of FIGS. 1 and 8 resides in the mounting means whereby the micrometer head 280 is applied to the upper end of the carrier 52, such means serving to eliminate the use of the depth gauge assembly 70 and the saddle clamp assembly 74 and the substitution for the latter of a supporting block 281 which is secured by screws 283 to the upper end face 72 of the carrier and which overhangs the rear edge of such end face and overlies the upper end face 76 of the pedestal 40. The micrometer head 280 is similar to the micrometer head 80 and, therefore, in order to avoid needless repetition of description, similar reference numerals but of a higher order have been applied to the corresponding parts of the two micrometer heads as between the disclosures of FIGS. 1 and 8. The micrometer head 280 has its sleeve portion 282 threadedly received as indicated at 285 in a bore 287 which is formed in the overhanging portion of the block 281 and a nut 289, when tightened, serves to lock the micrometer head in position on the block. The block is formed with an edge recess 291 in its bottom face and this recess serves as a clearance region for the nut 278. Since the micrometer head 280 is effectively secured to the upper end of the carrier 52 so that it movable bodily therewith, and since the micrometer spindle has the same relative disposition with respect to the upper end face of the pedestal 40, the operation of the gauging instrument of FIG. 8 is precisely the same as that described in connection with the instrument of FIGS. 1 to 6 inclusive so that it is not deemed necessary to describe such operation in detail.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

Having thus described the invention, what I claim and desire to secure by letters patent is:

1. A height gauge and measuring instrument for measuring, checking and marking distances on workpieces, said instrument comprising a base adapted for support on a surface plate or the like, a pedestal rigid with said base and projecting upwardly therefrom, said pedestal being provided with a flat horizontal upper end face, a vertically elongated carrier having a flat horizontal upper end face, said carrier being freely slidable endwise on said pedestal between a normal lowered position wherein its lower end rests on the surface plate and a raised position removed from said surface plate, a plurality of projections integrally formed on the carrier, projecting forwardly therefrom in equally and vertically spaced relationship, each projection presenting an upwardly facing horizontal gauging face and a downwardly facing horizontal gauging face, said projections being of equal thickness whereby the gauging surfaces thereon are spaced apart predetermined distances from each other, and an indicating micrometer head effective to positively and adjustably raise said carrier from its normal lowered position, said micrometer head including a thimble, a sleeve and a spindle disposed in coaxial relationship, means for fixedly and removably securing said sleeve to the upper end of said carrier in a vertical position wherein the micrometer head overlies the upper end face of the pedestal with the spindle having its lower end positioned for engagement with the latter, whereby upon rotation of the thimble in a direction to project the spindle from said sleeve, the micrometer head, and consequently the carrier, will move bodily upwardly in accordance with the indication of said micrometer head, said means for fixedly and removably securing said sleeve to the upper end of the carrier comprises a depth gauge assembly having a T-head mounted on the micrometer sleeve and having side legs projecting radially outwardly of the latter, and means for removably clamping one of said side legs to the upper end face of the carrier.

2. A height gauge and measuring instrument for measuring, checking and marking distances on workpieces as set forth in claim 1, wherein the means for removably clamping said one side leg to the upper end of the carrier comprises a generally U-shaped saddle clamp having parallel side arms and a connecting bight portion, the outer ends of said side arms being formed with inturned ends, the upper end region of the carrier being formed with horizontal slots therein into which the inturned ends of the side arms project, and a clamping screw projecting through said bight portion in threaded relationship and having its lower end engageable with said one side leg of the T-head whereby, upon tightening of said clamping screw, the side leg will be forced against the upper end face of the carrier.

\* \* \* \* \*